(12) United States Patent
Quigley et al.

(10) Patent No.: US 12,281,607 B2
(45) Date of Patent: Apr. 22, 2025

(54) DOSING CONTROL FOR SCR SYSTEMS

(71) Applicant: GM GLOBAL TECHNOLOGY OPERATIONS LLC, Detroit, MI (US)

(72) Inventors: David P Quigley, Brighton, MI (US); Sarah Funk, Canton, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 74 days.

(21) Appl. No.: 18/156,153

(22) Filed: Jan. 18, 2023

(65) Prior Publication Data

US 2024/0240580 A1 Jul. 18, 2024

(51) Int. Cl.
*F01N 3/20* (2006.01)

(52) U.S. Cl.
CPC ........ *F01N 3/208* (2013.01); *F01N 2560/026* (2013.01); *F01N 2610/02* (2013.01); *F01N 2900/1602* (2013.01)

(58) Field of Classification Search
CPC ............... F01N 3/208; F01N 2610/02; F01N 2560/026; F01N 2900/1602; F01N 11/00; F01N 2550/02; F01N 2560/06; F01N 2560/14; F01N 2900/1404; F01N 2900/1621; F01N 3/2066; F01N 9/00
See application file for complete search history.

(56) References Cited

U.S. PATENT DOCUMENTS 8,646,259 B2 * 2/2014 Gonze ..................... F01N 3/208
60/303

FOREIGN PATENT DOCUMENTS

DE 102016203223 * 8/2017

* cited by examiner

*Primary Examiner* — Phutthiwat Wongwian
*Assistant Examiner* — Diem T Tran
(74) *Attorney, Agent, or Firm* — Lorenz & Kopf LLP

(57) ABSTRACT

Methods and systems for controlling treatment of exhaust in a emission control system of a platform having an combustion system and one or more selective catalyst reduction catalysts (SCR) is provided. In an exemplary embodiment, the system includes: one or more sensors configured to obtain sensor data pertaining to an SCR temperature for the SCR; and a processor that is coupled to the one or more sensors and configured to at least facilitate controlling treatment of the exhaust based on the SCR temperature.

7 Claims, 2 Drawing Sheets

DOSING CONTROL FOR SCR SYSTEMS

INTRODUCTION

The technical field generally relates to the field of control of exhaust treatment for various vehicle applications and platforms.

Various platforms and other platforms today have systems for treatment of exhaust from an combustion system or other combustion system. However, existing techniques may not always provide optimal treatment of the exhaust of the system and/or of performing of diagnostics under certain conditions.

Accordingly, it is desirable to provide systems and methods for controlling of exhaust treatment, such as for platforms or other platforms. Furthermore, other desirable features and characteristics of the present invention will become apparent from the subsequent detailed description of the invention and the appended claims, taken in conjunction with the accompanying drawings and this background of the invention.

SUMMARY

In an exemplary embodiment, a method for controlling treatment of exhaust in a emission control system of a platform having an combustion system and a plurality of selective catalyst reduction catalysts (SCR) is provided that includes: obtaining, via one or more sensors, sensor data pertaining to an SCR temperature for the SCR; and controlling, via a processor, treatment of the exhaust based on the SCR temperature.

Also in an exemplary embodiment, the step of controlling the treatment of the exhaust includes arbitrating adjustment of NOx between the SCR based on the SCR temperature, in accordance with instructions provided by the processor.

Also in an exemplary embodiment, the method further includes determining, via the processor, whether diagnostics of the SCR has been completed or disabled; wherein the step of controlling the treatment of the exhaust includes controlling, via the processor, the treatment of the exhaust based on both the SCR temperature and as to whether the diagnostics of the SCR has been completed or disabled.

Also in an exemplary embodiment, the step of controlling the treatment of the exhaust includes adjusting a urea flow rate injected from an injector upstream of a front SCR of the emission control system, the front SCR being upstream of a diesel particulate filter (DPF), based on the SCR temperature and as to whether the diagnostics of the SCR has been completed or disabled, such that the step of controlling the treatment of the exhaust includes: providing the fluid from the injector to the SCR with an ammonia to nitrogen oxide (NOx) ratio (ANR) that is less than one, when the SCR temperature is greater than a predetermined value and the diagnostics of the SCR has been completed or disabled, in accordance with instructions provided by the processor; and providing the fluid from the injector to the SCR with the ANR instead being greater than one, when the SCR temperature is less than or equal to the predetermined value or the diagnostics of the SCR has not been completed or disabled, in accordance with instructions provided by the processor.

Also in an exemplary embodiment: the SCR includes both a front SCR and a rear SCR for the emission control system; the step of obtaining the sensor data includes obtaining, via the one or more sensors, the sensor data pertaining to a rear SCR temperature for the rear SCR; and the step of controlling the treatment of the exhaust includes controlling, via the processor, the treatment of the exhaust based on the rear SCR temperature.

Also in an exemplary embodiment, the step of controlling the treatment of the exhaust includes controlling, via the processor, the treatment of the exhaust based on both the rear SCR temperature and whether diagnostics of the front SCR has been completed or disabled.

Also in an exemplary embodiment, the step of controlling the treatment of the exhaust includes adjusting an urea flow rate of fluid injected from an injector into the exhaust upstream of the front SCR based on the rear SCR temperature and as to whether the diagnostics of the front SCR has been completed or disabled, such that the step of controlling the treatment of the exhaust includes: providing the fluid from the injector to the front SCR with an ammonia to nitrogen oxide (NOx) ratio (ANR) that is less than one, when the rear SCR temperature is greater than a predetermined value and the diagnostics of the front SCR has been completed or disabled, in accordance with instructions provided by the processor; and providing the fluid from the injector to the front SCR with the ANR instead being greater than one, when the rear SCR temperature is less than or equal to the predetermined value or the diagnostics of the front SCR has not been completed or disabled, in accordance with instructions provided by the processor.

In another exemplary embodiment, a system for controlling treatment of exhaust in a emission control system of a platform having an combustion system and a plurality of selective catalyst reduction catalysts (SCR) is provided that includes: one or more sensors configured to obtain sensor data pertaining to an SCR temperature for the SCR; and a processor that is coupled to the one or more sensors and configured to at least facilitate controlling treatment of the exhaust based on the SCR temperature.

Also in an exemplary embodiment, the processor is further configured to at least facilitate arbitrating adjustment of NOx between the SCR based on the SCR temperature, in accordance with instructions provided by the processor.

Also in an exemplary embodiment, the processor is further configured to at least facilitate: determining whether diagnostics of the SCR has been completed or disabled; and controlling the treatment of the exhaust based on both the SCR temperature and as to whether the diagnostics of the SCR has been completed or disabled.

Also in an exemplary embodiment, the processor is further configured to at least facilitate adjusting a urea flow rate of injected from an injector upstream of a front SCR of the emission control system, the front SCR being upstream of a diesel particulate filter (DPF), based on the SCR temperature and as to whether the diagnostics of the SCR has been completed or disabled, such that the processor controls the treatment of the exhaust by at least facilitating: providing the fluid from the injector to the SCR with an ammonia to nitrogen oxide (NOx) ratio (ANR) that is less than one, when the SCR temperature is greater than a predetermined value and the diagnostics of the SCR has been completed or disabled, in accordance with instructions provided by the processor; and providing the fluid from the injector to the SCR with the ANR instead being greater than one, when the SCR temperature is less than or equal to the predetermined value or the diagnostics of the SCR has not been completed or disabled, in accordance with instructions provided by the processor.

Also in an exemplary embodiment the SCR includes both a front SCR and a rear SCR for the emission control system; the one or more sensors are configured to obtain the sensor data pertaining to a rear SCR temperature for the rear SCR; and the processor is further configured to at least facilitate controlling the treatment of the exhaust based on the rear SCR temperature.

Also in an exemplary embodiment, the processor is further configured to at least facilitate controlling the treatment of the exhaust based on both the rear SCR temperature and whether diagnostics of the front SCR has been completed or disabled.

Also in an exemplary embodiment, the processor is further configured to at least facilitate adjusting an urea flow rate of fluid injected from an injector into the exhaust upstream of the front SCR based on the rear SCR temperature and as to whether the diagnostics of the front SCR has been completed or disabled, such that the processor controls the treatment of the exhaust by at least facilitating: providing the fluid from the injector to the front SCR with an ammonia to nitrogen oxide (NOx) ratio (ANR) that is less than one, when the rear SCR temperature is greater than a predetermined value and the diagnostics of the front SCR has been completed or disabled, in accordance with instructions provided by the processor; and providing the fluid from the injector to the front SCR with the ANR instead being greater than one, when the rear SCR temperature is less than or equal to the predetermined value or the diagnostics of the front SCR has not been completed or disabled, in accordance with instructions provided by the processor.

In another exemplary embodiment, a platform is provided that includes a body, a emission control system, and a controller. The emission control system includes an combustion system and a plurality of selective catalyst reduction catalysts (SCR). The one or more sensors are configured to obtain sensor data pertaining to an SCR temperature for the SCR. The processor is coupled to the one or more sensors, and is configured to at least facilitate controlling treatment of the exhaust based on the SCR temperature.

Also in an exemplary embodiment, the processor is further configured to at least facilitate arbitrating adjustment of NOx between the SCR based on the SCR temperature.

Also in an exemplary embodiment, the processor is further configured to at least facilitate: determining whether diagnostics of the SCR has been completed or disabled; and controlling treatment of the exhaust based on both the SCR temperature and as to whether the diagnostics of the SCR has been completed or disabled.

Also in an exemplary embodiment, the processor is further configured to at least facilitate adjusting an urea flow rate of fluid injected from an injector into the exhaust upstream of the SCR based on the SCR temperature and as to whether the diagnostics of the SCR has been completed or disabled, such that the processor controls the treatment of the exhaust by at least facilitating: providing the fluid from the injector to the SCR with an ammonia to nitrogen oxide (NOx) ratio (ANR) that is less than one, when the SCR temperature is greater than a predetermined value and the diagnostics of the SCR has been completed or disabled, in accordance with instructions provided by the processor; and providing the fluid from the injector to the SCR with the ANR instead being greater than one, when the SCR temperature is less than or equal to the predetermined value or the diagnostics of the SCR has not been completed or disabled, in accordance with instructions provided by the processor.

Also in an exemplary embodiment, the SCR includes both a front SCR and a rear SCR for the emission control system; the one or more sensors are configured to obtain the sensor data pertaining to a rear SCR temperature for the rear SCR; and the processor is further configured to at least facilitate controlling the treatment of the exhaust based on both the rear SCR temperature and whether diagnostics of the front SCR has been completed or disabled.

Also in an exemplary embodiment, the processor is further configured to at least facilitate adjusting an urea flow rate of fluid injected from an injector into the exhaust upstream of the front SCR based on the rear SCR temperature and as to whether the diagnostics of the front SCR has been completed or disabled, such that the processor controls the treatment of the exhaust by at least facilitating: providing the fluid from the injector to the front SCR with an ammonia to nitrogen oxide (NOx) ratio (ANR) that is less than one, when the rear SCR temperature is greater than a predetermined value and the diagnostics of the front SCR has been completed or disabled, in accordance with instructions provided by the processor; and providing the fluid from the injector to the front SCR with the ANR instead being greater than one, when the rear SCR temperature is less than or equal to the predetermined value or the diagnostics of the front SCR has not been completed or disabled, in accordance with instructions provided by the processor.

DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the disclosure or the application and uses thereof. Furthermore, there is no intention to be bound by any theory presented in the preceding background or the following detailed description.

Figure 1:
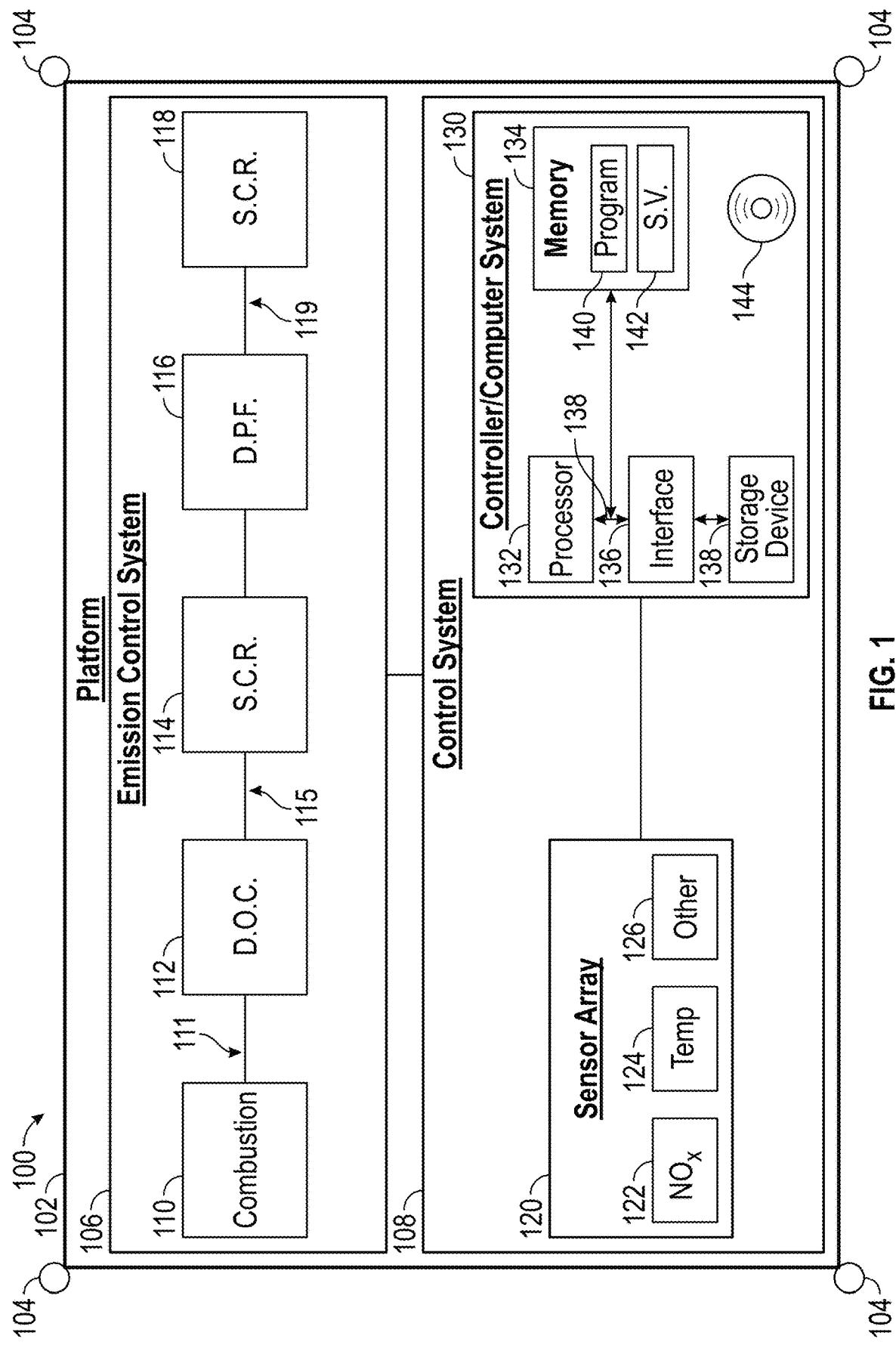
FIG. 1 is a functional block diagram of a platforms, such as a vehicle, having an emission control system that includes a combustion system, such as an engine, as well as a controller for treating exhaust from the combustion system, in accordance with an exemplary embodiment.
Figure 2:
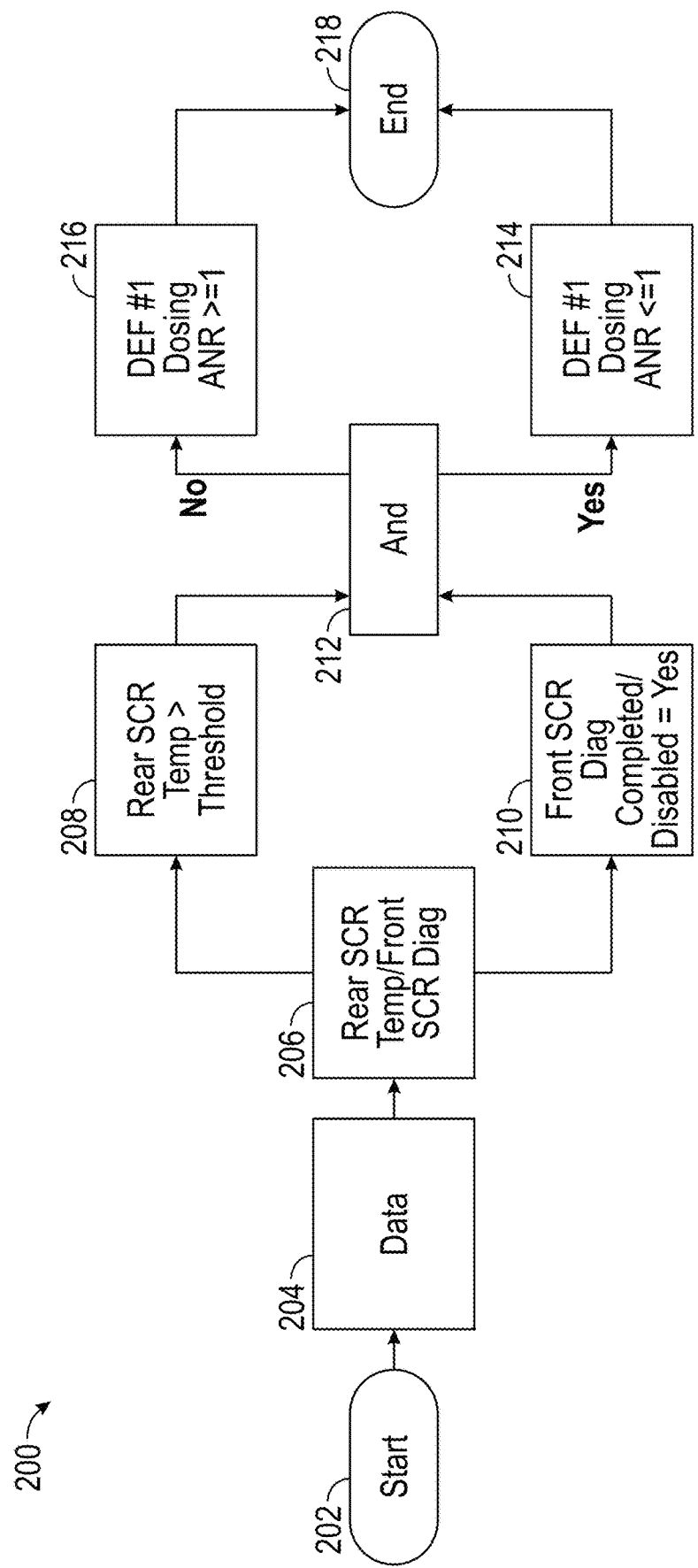
FIG. 2 is a flowchart of a process for controlling treatment of exhaust, and that can be implemented in connection with the platform of FIG. 1, including the emission control system and controller thereof, in accordance with an exemplary embodiment.

FIG. 1 illustrates a platform 100, according to an exemplary embodiment. As described in greater detail further below, the platform 100 includes a control system 108 for controlling combustion system exhaust for the platform 100, in accordance with the steps of the process that is depicted in FIG. 2 and described further below in connection therewith.

In various embodiments, the platform 100 includes a body 102, one or more wheels 104, and a emission control system 106, in addition to the control system 108 noted above.

In certain embodiments, the platform 100 comprises a vehicle, such as an automobile. In various embodiments, the platform 100 may be any one of a number of different types of automobiles, such as, for example, a sedan, a wagon, a truck, or a sport utility platform (SUV), and may be two-wheel drive (2WD) (i.e., rear-wheel drive or front-wheel drive), four-wheel drive (4WD) or all-wheel drive (AWD), and/or various other types of platforms in certain embodiments. In certain embodiments, the platform 100 may also comprise a motorcycle and/or one or more other types of platforms. In addition, in various embodiments, it will also be appreciated that the platform 100 may comprise any number of other types of vehicles, and/or any one of a number of different types of mobile platforms and/or other platforms.

In the depicted embodiment, the platform 100 includes a body 102 that substantially encloses other components of the platform 100. Also in the depicted embodiment, the platform 100 includes one or more wheels 104. In various embodiments, the wheels 104 are each rotationally coupled to one or more of the axles (not depicted) near a respective corner of the body 102 to facilitate movement of the platform 100. In one embodiment, the platform 100 includes four wheels 104, although this may vary in other embodiments (for example for trucks and certain other platforms). In various embodiments, the emission control system 106 (described in greater detail below) drives the wheels 104 for propulsion of the platform 100, including the body 102 thereof.

In various embodiments, the emission control system 106 includes one or more combustion systems 110 (e.g., engines, in certain embodiments), along with diesel oxidation catalysts (DOC) 112, selective catalyst reduction catalysts (SCR) 114, 118, and diesel particulate filters (DPF) 116.

In various embodiments, the combustion system 110 comprises a diesel combustion system, such as a diesel engine that drives the wheels 104 for propulsion of the platform 100, including the body thereof. In various embodiments, the combustion system 110 includes an outlet 111 through which exhaust exits the combustion system 110 and flows through the remainder of the emission control system 106.

Also in various embodiments, the DOC 112 is coupled to the combustion system 110, proximate the outlet 111. In various embodiments, the DOC 112 is close-coupled to the combustion system 110. In various embodiments, the DOC 112 is connected to the outlet 111 of the combustion system 110. In various embodiments, the DOC 112 receives exhaust from the combustion system 110 via the outlet 111, and converts carbon monoxide and hydrocarbons into carbon dioxide and water. While a single DOC 112 is depicted, it will be appreciated that the number of DOC 112 devices may vary in other embodiments.

In various embodiments, the DPF 116 filters particles (including carbon matter and/or soot) from the combustion system exhaust.

In various embodiments, the SCR 114, 118 reduce nitrogen oxides (NOx) in the exhaust. Also in various embodiments, each SCR 114, 118 is coupled to a respective injector 115, 119. In various embodiments, injectors 115 and 119 inject diesel exhaust fluid into the exhaust stream upstream of the SCR 114, 118. In certain embodiments, the diesel exhaust fluid (DEF) is a solution of water and urea where the concentration of urea is approximately thirty two and one half percent (~32.5%), for example as specified by ISO standards. Also in various embodiments, the DEF decomposes to ammonia by chemical reactions once injected into the exhaust stream. Also in various embodiments, the flow rate of DEF injection is varied by the control system 108 to meet the requested quantity of NH3 needed for Nox reduction reactions in the SCR 114, 118.

As depicted in in FIG. 1, in various embodiments emission control system 106 includes multiple diesel exhaust fluid (DEF)/SCR aftertreatment systems 114, 118 with a particulate filter DPF 116 between. Also in various embodiments, the dosing control and diagnostic strategies for the control system 108 and the process 200 of FIG. 2 (described below) are with respect to the front SCR 114. This contrasts with other technologies, which for example control the downstream SCR 118 based on output from the front SCR 114.

Also as depicted in FIG. 1, in one exemplary embodiment the front SCR 114 is upstream of the DPF 116, while the rear SCR 118 is downstream of the DPF 116. In addition, as described in greater detail further below in connection with the control system 108 and the process 200 of FIG. 2, in an exemplary embodiment the control strategy is to limit dosing (low ammonia to NOx ratio or ANR) to the front SCR 114.

In various embodiments, the control system 108 is coupled to the emission control system 106, and provides instructions for controlling the treatment of exhaust from the combustion system 110. In various embodiments, the control system 108 controls the ratio or proportion of ammonia to NOx for the diesel exhaust fluid via one or more of the injectors 115, 119 to one or more of the SCR 114, 118. In addition, in certain embodiments, the control system 108 controls diagnostics for one or more of the SCR 114, 118, among other features pertaining to the platform 100 and the emission control system 106 thereof. In various embodiments, the control system 108 provides these functions as described further below in connection with the process 200 of FIG. 2.

As depicted in FIG. 1, in various embodiments, the control system 108 includes a sensor array 120 and a controller 130.

In various embodiments, the sensor array 120 includes various sensors for obtaining sensor data pertaining to the combustion system 110, the emission control system 106, and/or the platform 100 in general. As depicted in FIG. 1, in various embodiments, the sensor array 120 includes one or more NOx sensors 122 and temperature sensors 124, and in certain embodiments may also include one or more other sensors 126.

In various embodiments, the one or more NOx sensors 122 obtain NOx sensor data pertaining to an amount or concentration of NOx in the combustion system exhaust. In various embodiments, the NOx sensors 122 measure an amount or concentration of NOx at one or more locations of the emission control system 106, including as the exhaust enters and exits the front SCR 114 of the emission control system.

Also in various embodiments, the one or more temperature sensors 124 obtain temperature data pertaining to a temperature within the emission control system 106. In various embodiments, the temperature sensors 124 measure a temperature in or proximate the rear SCR 118 of the emission control system 106.

Also in various embodiments, the controller 130 comprises a computer system that is coupled to the sensor array 120 and the injectors 115, 119, and in certain embodiments also to one or more other components of the emission control system 106 and/or the platform 100 in general. In various embodiments, the controller 130 is configured to provide instructions for controlling the treatment of exhaust from the combustion system 110. In various embodiments, the controller 130 arbitrates DEF dosing depending on SCR temperature and as to whether SCR diagnostics has been completed or terminated for the emission control system 106. In various embodiments, these steps are performed in conjunction with the process 200 depicted in FIG. 2 and described further below in connection therewith.

As depicted in FIG. 1, in various embodiments, the controller 130 comprises a computer system comprising a processor 132, a memory 134, an interface 136, a storage device 138, a bus 138, and a disk 146. In certain embodiments, the controller 130 may also include the sensor array 120, one or more of the other systems or components thereof, and/or one or more other platform components. In addition, it will be appreciated that the controller 130 may otherwise differ from the embodiment depicted in FIG. 1. For example, the controller 130 may be coupled to or may otherwise utilize one or more remote computer systems and/or other control systems, for example as part of one or more of the above-identified platform devices and systems.

In the depicted embodiment, the computer system of the controller 130 includes a processor 132, a memory 134, an interface 136, a storage device 138, and a bus 138. The processor 132 performs the computation and control functions of the controller 130, and may comprise any type of processor or multiple processors, single integrated circuits such as a microprocessor, or any suitable number of integrated circuit devices and/or circuit boards working in cooperation to accomplish the functions of a processing unit. During operation, the processor 132 executes one or more programs 140 contained within the memory 134 and, as such, controls the general operation of the controller 130 and the computer system of the controller 130, generally in executing the processes described herein, such as the process 200 discussed further below in connection with FIG. 2.

The memory 134 can be any type of suitable memory. For example, the memory 134 may include various types of dynamic random access memory (DRAM) such as SDRAM, the various types of static RAM (SRAM), and the various types of non-volatile memory (PROM, EPROM, and flash). In certain examples, the memory 134 is located on and/or co-located on the same computer chip as the processor 132. In the depicted embodiment, the memory 134 stores the above-referenced program 140 along with one or more stored values 142 (e.g., including, in various embodiments, predetermined threshold values for controlling emissions of the emission control system 106).

The bus 138 serves to transmit programs, data, status and other information or signals between the various components of the computer system of the controller 130. The interface 136 allows communications to the computer system of the controller 130, for example from a system driver and/or another computer system, and can be implemented using any suitable method and apparatus. In one embodiment, the interface 136 obtains the various data from the sensor array 120, the emission control system 106, and/or one or more other components and/or systems of the platform 100. The interface 136 can include one or more network interfaces to communicate with other systems or components. The interface 136 may also include one or more network interfaces to communicate with technicians, and/or one or more storage interfaces to connect to storage apparatuses, such as the storage device 138.

The storage device 138 can be any suitable type of storage apparatus, including various different types of direct access storage and/or other memory devices. In one exemplary embodiment, the storage device 138 comprises a program product from which memory 134 can receive a program 140 that executes one or more embodiments of one or more processes of the present disclosure, such as the steps of the process 200 discussed further below in connection with FIG. 2. In another exemplary embodiment, the program product may be directly stored in and/or otherwise accessed by the memory 134 and/or one or more other disks 146 and/or other memory devices.

The bus 138 can be any suitable physical or logical means of connecting computer systems and components. This includes, but is not limited to, direct hard-wired connections, fiber optics, infrared and wireless bus technologies. During operation, the program 140 is stored in the memory 134 and executed by the processor 132.

It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 132) to perform and execute the program. Such a program product may take a variety of forms, and the present disclosure applies equally regardless of the particular type of computer-readable signal bearing media used to carry out the distribution. Examples of signal bearing media include: recordable media such as floppy disks, hard drives, memory cards and optical disks, and transmission media such as digital and analog communication links. It will be appreciated that cloud-based storage and/or other techniques may also be utilized in certain embodiments. It will similarly be appreciated that the computer system of the controller 130 may also otherwise differ from the embodiment depicted in FIG. 1, for example in that the computer system of the controller 130 may be coupled to or may otherwise utilize one or more remote computer systems and/or other control systems.

FIG. 2 is a flowchart of a process 200 for controlling treatment of exhaust form an combustion system of a platform. In various embodiments, the process 200 may be implemented in connection with the platform 100 of FIG. 1, including the emission control system 106 and control system 108 thereof.

As depicted in FIG. 2, in various embodiments the process 200 begins at 202. In certain embodiments, the process 200 begins when one or more events occur to indicate that a combustion system (such as a diesel engine and/or other combustion system 110 of FIG. 1) is starting and/or operating. In various embodiments, the steps of the process 200 continue, preferably continually, so long as the combustion system 110 is operating.

Sensor data is collected at 204. In various embodiments, sensor data is collected from various sensors of the sensor array 120 of FIG. 1. In various embodiments, sensor data is obtained as to operation of the emission control system 106 of FIG. 1. Also in various embodiments, the sensor data is obtained via the sensor array 120 of FIG. 1.

Specifically, in various embodiments, temperature data is obtained as to a temperature at one or more locations of the emission control system 106. In various embodiments, the temperature data is obtained from one or more temperature sensors 124 of the emission control system 106. In certain embodiments, the temperature data is obtained from one or more temperature sensors 124 that are disposed within or proximate the rear SCR 118, and that measure a temperature of the rear SCR 118.

Also in various embodiments, NOx data is obtained via the NOx sensors 122 as to an amount or concentration of NOx in the emission control system 106. In various embodiments, the NOx data is obtained from multiple NOx sensors 122 that are disposed before and after one or more of the SCR 114, 118 of FIG. 1, so as to detect differentials in NOx amounts or concentrations as the exhaust flows through the one or more SCR 114, 118. Also in various embodiments, the diagnostics of the SCR 114, 118 (particularly the front SCR 114) are monitored as to whether the diagnostics have been performed and as to whether the diagnostics have been disabled.

In various embodiments, determinations are made as to the SCR (step 206). In various embodiments, during step 206, an SCR temperature value is determined as to a temperature of one or more of the SCR 114, 118 of FIG. 1 based on the sensor data of step 204. In various embodiments, the SCR temperature value represents a temperature of the rear SCR 118 of FIG. 1. In addition, in certain embodiments, the SCR temperature value may represent an average temperature value that is calculated by the processor 132 of FIG. 1 based on multiple SCR temperatures that may be obtained via multiple temperature sensors 124 and/or at multiple different points in time. Also in various embodiments, a determination is also made during step 206 as to whether diagnostics of the SCR 114, 118 (e.g., as to the front SCR 114) has been completed or disabled via the processor 132.

Also in various embodiments, a determination in made at step 208 as to whether the SCR temperature value is greater than a predetermined threshold. In various embodiments, this determination is also made by the processor 132 of FIG. 1 using a predetermined value that has been stored in the memory 134 of FIG. 1 as one of the stored values 142 therein.

Also in various embodiments, a determination is made at step 210 as to whether diagnostics on the front SCR 114 are completed and/or disabled. In various embodiments, this condition is satisfied when any of the following are true: (a) the diagnostics of the front SCR 114 has also already been completed; or (b) the diagnostics of the front SCR 114 have been disabled; or (c) when both are true. In various embodiments, these determinations are made by the processor 132 of FIG. 1.

Also in various embodiments, a determination is made in step 212 as to whether the conditions of steps 208 and 210 are both satisfied. Specifically, in step 212, an additional determination is made as to whether both (a) the SCR temperature (e.g., of the rear SCR 118) is greater than the predetermined threshold; and (b) the diagnostics (e.g., of the front SCR 114) have either been completed or disabled. In various embodiments, these determinations are made by the processor 132 of FIG. 1.

In various embodiments, if it is determined that both conditions of step 212 are satisfied (namely, that (a) the SCR temperature (e.g., of the rear SCR 118) is greater than the predetermined threshold; and (b) the diagnostics (e.g., of the front SCR 114) have either been completed or disabled), then the process proceeds to step 214.

Specifically, in various embodiments, during step 214, ammonia dosing for the SCR is decreased. In various embodiments, the ammonia dosing for the front SCR 114 of FIG. 1 is decreased, resulting in a reduced ratio of ammonia to NOx for the front SCR 114. In various embodiments, the injector 115 of FIG. 1 supplies the reduced ratio of ammonia to NOx for the front SCR 114 of FIG. 1, so that an ammonia to NOx ratio (ANR) is less than one for the DEF injected into the exhaust upstream of the front SCR 114. In various embodiments, this is performed in accordance with instructions provided by the processor 132 of FIG. 1 that are implemented via the injector 115. Also in various embodiments, in this scenario in which the temperature of the rear SCR 118 is relatively high and the ANR is decreased accordingly. In various embodiments, this is implemented via the processor 132 of FIG. 1.

In various embodiments, the process either continues (e.g., with obtaining new or updated sensor data in a new iteration of step 204) and/or terminates (e.g., once the combustion system is turned off or the current ignition cycle or platform drive is completed) at step 220.

Conversely, and with reference back to step 212, in various embodiments if it is instead determined that one or more of the conditions of step 212 are not satisfied (namely, that (a) the SCR temperature (e.g., of the rear SCR 118) is less than or equal to the predetermined threshold; and/or that (b) the diagnostics (e.g., of the front SCR 114) have neither been completed nor disabled), then the process proceeds instead to step 216. In various embodiments, during step 216, the dosing control is weighted away from passing regeneration and toward active regeneration.

Specifically, in various embodiments, during step 216, ammonia dosing for the SCR is increased. In various embodiments, the ammonia dosing for the front SCR 114 of FIG. 1 is increased, resulting in an increased ratio of ammonia to NOx for the front SCR 114. In various embodiments, the injector 115 of FIG. 1 supplies the increased ratio of ammonia to NOx into the exhaust upstream of the front SCR 114 of FIG. 1, so that an ammonia to NOx ratio (ANR) is greater than one for the DEF (diesel exhaust fuel) injected into the exhaust upstream of the front SCR 114. In various embodiments, this is performed in accordance with instructions provided by the processor 132 of FIG. 1 that are implemented via the injector 115. Also in various embodiments, in this scenario in which the temperature of the rear SCR 118 is relatively low and the ANR is increased accordingly, the exhaust treatment is shifted toward active regeneration. In various embodiments, this is implemented via the processor 132 of FIG. 1.

In various embodiments, the process either continues (e.g., with obtaining new or updated sensor data in a new iteration of step 204) and/or terminates (e.g., once the combustion system is turned off or the current ignition cycle or platform operation is completed) at step 220.

Accordingly, methods, and systems are provided for control of treatment of emissions from combustion systems, such as engines. As described in greater detail above, in various embodiments, a temperature of the rear SCR 118 is utilized in controlling the urea flow rate of fluid injected into one or more SCR 114 of FIG. 1. In certain embodiments, a determination as to whether diagnostics have been performed or disabled with respect to the front SCR 114 is also used, in conjunction with the rear SCR 118 temperature.

It will be appreciated that the systems, platforms, applications, and implementations may vary from those depicted in the Figures and described herein. For example, in various embodiments, the platform 100, control system 108, emission control system 106, components thereof, and/or other components may differ from those depicted in FIG. 1 and/or described above in connection therewith. It will also be appreciated that the steps of the process 200 may differ, and/or that various steps thereof may be performed simultaneously and/or in a different order, than those depicted in FIG. 2 and/or described above.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method for controlling treatment of exhaust in an emission control system of a platform having a combustion system and a plurality of selective catalyst reduction catalysts (SCR) comprising both a front SCR and a rear SCR for the emission control system, the method comprising:
obtaining, via one or more sensors, sensor data pertaining to a rear SCR temperature for the rear SCR;
determining, via a processor, whether diagnostics of the front SCR has been completed or disabled; and
controlling, via the processor, treatment of the exhaust based on the rear SCR temperature of the rear SCR, wherein the step of controlling the treatment of the exhaust comprises controlling, via the processor, the treatment of the exhaust by adjusting a urea flow rate of urea fluid injected from an injector into the exhaust upstream of the front SCR based both on the rear SCR temperature of the rear SCR and as to whether the diagnostics of the front SCR has been completed or disabled, such that the controlling of the treatment of the exhaust comprises:
providing the urea fluid from the injector to the front SCR with an ammonia to nitrogen oxide (NOx) ratio (ANR) that is less than one, when the rear SCR temperature of the rear SCR is greater than a predetermined value and the diagnostics of the front SCR has been completed or disabled, in accordance with instructions provided by the processor; and
providing the urea fluid from the injector to the front SCR with the ANR being greater than one, when the rear SCR temperature of the rear SCR is less than or equal to the predetermined value and the diagnostics of the front SCR has not been completed or disabled, in accordance with instructions provided by the processor.

2. The method of claim 1, wherein the controlling of the treatment of the exhaust comprises selectively arbitrating adjustment of NOx between the plurality of SCR based on the SCR temperature of the one of the plurality of SCR, in accordance with instructions provided by the processor.

3. A system for controlling treatment of exhaust in an emission control system of a platform having a combustion system and a plurality of selective catalyst reduction catalysts (SCR) comprising both a front SCR and a rear SCR for the e mission control system, the system comprising:
one or more sensors configured to obtain sensor data pertaining to a rear SCR temperature for the rear SCR; and
a processor that is coupled to the one or more sensors and configured to at least facilitate:
determining, via the processor, whether diagnostics of the front SCR has been completed or disabled;
controlling treatment of the exhaust based on the rear SCR temperature of the rear SCR, wherein the processor at least facilitates controlling the treatment of the exhaust by adjusting a urea flow rate of urea fluid injected from an injector into the exhaust upstream of the front SCR based both on the rear SCR temperature of the rear SCR and as to whether the diagnostics of the front SCR has been completed or disabled, including by:
providing the urea fluid from the injector to the other front SCR with an ammonia to nitrogen oxide (NOx) ratio (ANR) that is less than one, when the rear SCR temperature of the rear SCR is greater than a predetermined value and the diagnostics of the front SCR has been completed or disabled, in accordance with instructions provided by the processor; and providing the urea fluid from the injector to the front SCR with the ANR being greater than one, when the rear SCR temperature of the rear SCR is less than or equal to the predetermined value or the diagnostics of the front SCR has not been completed or disabled, in accordance with instructions provided by the processor.

4. The system of claim 3, wherein the processor is further configured to at least facilitate selectively arbitrating adjustment of NOx between the plurality of SCR catalysts based on the rear SCR temperature of the rear SCR, in accordance with instructions provided by the processor.

5. A platform comprising:
an emission control system comprising a combustion system and a plurality of selective catalyst reduction catalysts (SCR) comprising both a front SCR and a rear SCR for the emission control system; and a controller comprising:
one or more sensors configured to obtain sensor data pertaining to an SCR temperature comprising a rear SCR temperature for the rear SCR; and
a processor that is coupled to the one or more sensors and configured to at least facilitate controlling treatment of the exhaust by adjusting a urea flow rate of urea fluid injected from an injector into the exhaust gas stream upstream of the front SCR based on both the rear SCR temperature and whether diagnostics of the front SCR has been completed or disabled.

6. The platform of claim 5, wherein the processor is further configured to at least facilitate selectively arbitrating adjustment of NOx between the front and rear SCR based on the rear SCR temperature.

7. The platform of claim 5, wherein the processor controls the treatment of the exhaust by at least facilitating: providing the urea fluid from the injector to the front SCR with an ammonia to nitrogen oxide (NOX) ratio (ANR) that is less than one when the rear SCR temperature is greater than a predetermined value and the diagnostics of the front SCR has been completed or disabled, in accordance with instructions provided by the processor; and
providing the urea fluid from the injector to the front SCR with the ANR being greater than one when the rear SCR temperature is less than or equal to the predetermined value or the diagnostics of the front SCR has not been completed or disabled, in accordance with instructions provided by the processor.

* * * * *